May 30, 1933.                F. A. FAUST                1,911,753
                           CONTROL SYSTEM
                        Filed Jan. 28, 1932           3 Sheets-Sheet 1

INVENTOR
FRED A. FAUST
BY
ATTORNEY

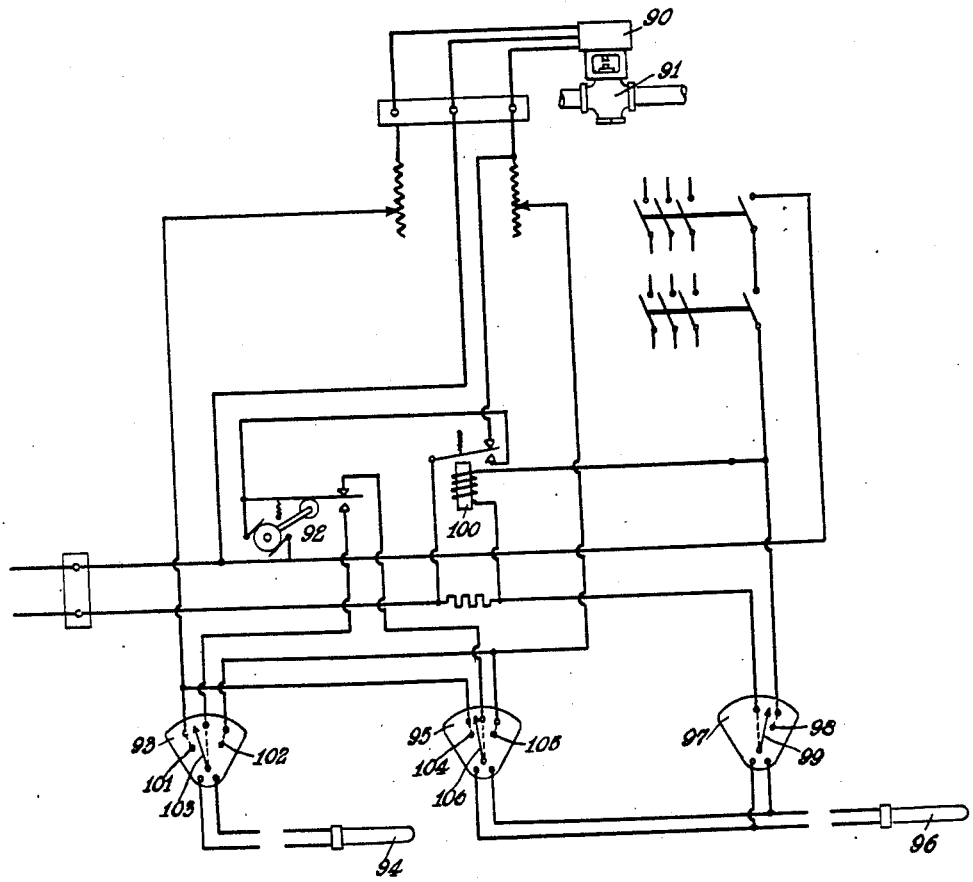

Patented May 30, 1933

1,911,753

UNITED STATES PATENT OFFICE

FRED A. FAUST, OF NAUGATUCK, CONNECTICUT, ASSIGNOR TO THE BRISTOL COMPANY, OF WATERBURY, CONNECTICUT, A CORPORATION OF CONNECTICUT

CONTROL SYSTEM

Application filed January 28, 1932. Serial No. 589,409.

The invention relates to a control system suitable for use, for example, in the regulation of temperatures in heat-exchange apparatus and wherein a reversible electric motor device is arranged to regulate the supply of a heating medium for maintaining the desired condition. It is more especially concerned with systems wherein the valve disk of a valve controlled by the motor is caused to float between a fully opened and a fully closed position in accordance with the heat requirements, rather than effecting a complete closure or opening of the valve for the regulation.

In a co-pending application for temperature regulating system, filed by me of even date herewith, I have disclosed interrupter apparatus associated with relays for effecting a control of the motor, and it is an object of the present invention to eliminate the relay elements and effect the control solely by means of interrupter mechanism.

A further object of the invention resides in the provision of a safety circuit in connection with the motor control circuit whereby the motor will be caused to operate the valve to a closed position independently of the interrupter control in the event that the temperature to be maintained exceeds a predetermined maximum, as well as in the event that it should be attempted to operate the system without all of the apparatus operative.

To this end, use is made of a reversible electric motor for controlling automatically a valve utilized to regulate the admission of a heating medium, such as steam, to a heat-supplying liquid, for example as circulated in heat-exchange relation with another liquid and whose outlet temperature it is desired to maintain at a predetermined point.

The said motor, through intermediate electrical devices and circuits, is under the primary control of a pair of contact devices which are, in turn, actuated from respective thermo-sensitive elements located in one or both of the media and responsive to changes of temperature therein. These contact devices are designed to operate through interrupting means which serve alternately, or successively, to energize the motor for opposite rotation, the particular direction of rotation depending upon the condition of the respective contact devices.

Provision is also made for by-passing this interrupter mechanism to energize, under certain conditions, the motor device directly in the closing of the regulating valve.

The nature of the invention, however, will best be understood when described in connection with the accompanying drawings, in which:

Fig. 5 illustrates a modification therein.

Figure 1:
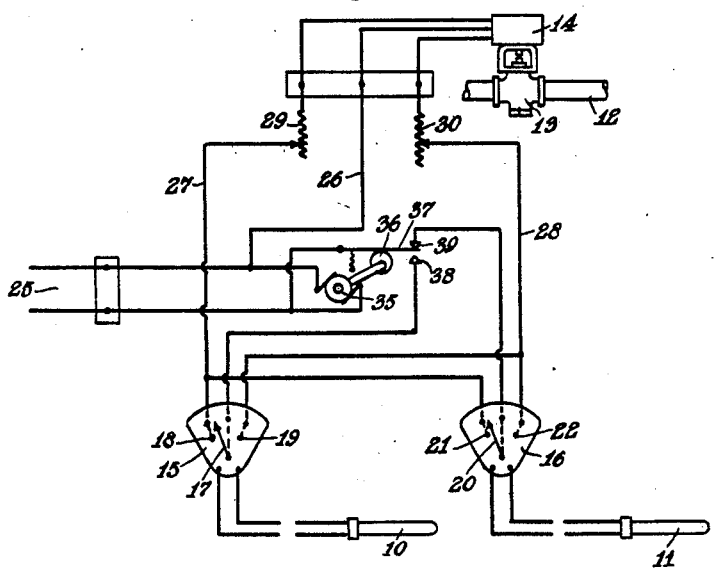
Fig. 1 illustrates diagrammatically the circuit of the novel system with responsive means, contact devices, interrupter and motor-regulated valve included therein.

The system herein disclosed is particularly adaptable to the regulation of the outgoing temperature of a continuous supply of liquid medium, for example as exemplified in the pasteurization of milk and as is set forth in U. S. Patent #1,750,001, and in my copending applications for temperature regulating system filed of even date herewith.

It is to be understood, however, that the present invention is not restricted to such application and contemplates broadly the maintenance of a predetermined condition, as in the regulation of a supply of heating fluid for maintaining a predetermined temperature condition, through means responsive to variations in such conditions and/or an associated condition by the operation of an electric motor device for control purposes, as in the control of the supply of heating fluid.

As disclosed in the drawings, the control arrangement is particularly suitable for use with pasteurization apparatus and in which embodiment a thermo-responsive element 10 is then adapted to be inserted, for example, in the heating fluid (water) of a heat-interchange apparatus (not shown) and a thermo-sensitive element 11 in the fluid medium to be heated (milk) and passing through said heat-interchange apparatus, generally in a direction opposite to the flow of the heating liquid therethrough. The water or other heating liquid is usually circulated at a constant rate of flow while the medium to be heated may vary both as to rate of flow and inlet temperature, and provision is made to introduce a heating medium to the heating liquid to compensate for these variations in both flow and inlet temperature of the medium to be heated. Thus, steam or the like may be introduced through a pipe 12 and regulated by a valve 13 under the control of a reversible electric motor 14. This motor is automatically controlled in the manner hereinafter set forth under the influence of the variations in temperatures to which the responsive means 10 and 11 are subjected.

In the present arrangement as shown in Fig. 1, this control is effected through a pair of contact devices 15 and 16 actuated respectively by the thermo-sensitive elements 10 and 11. The former contact device embodies a movable contact-making arm 17 and a low contact point 18 and high contact point 19, while the device 16 embodies a contact-making arm 20 and a low contact point 21 and high contact point 22, the latter contact point 22 corresponding to, and being adjustable to, the desired predetermined normal outlet temperature of the outgoing fluid medium.

The rotation of motor 14 in one direction or the other is controlled from the mains 25 by these contact devices and by an interrupter element, a common lead 26 being taken from the said mains directly to the motor. Leads 27 and 28 are also connected thereto in a manner such that, when the lead 27 is energized, it will operate the motor to open the valve 13 and when the lead 28 is energized it will operate the motor to close the said valve, all of which is well understood and forms no particular part of the present invention. Suitable resistances 29 and 30 are included in the respective leads 27 and 28 for regulating the desired speed of operation of the motor.

The interrupting device hereinbefore noted comprises a motor 35 driven directly and continuously from the mains 25 and driving a cam member or the like 36 engaging a movable arm 37 to oscillate the same to alternately make contact with two oppositely disposed contact elements 38 and 39, respectively. The former is connected with the arm 17 of contact device 15 and the latter with the arm 20 of contact device 16, while the movable contact-making arm 36 is connected to one side of the power mains 25. Motor lead 27 is connected to both of the low-point contacts 18 and 21, while motor lead 28 is connected to the high-point contacts 19 and 22.

By following the circuit connections indicated, it will readily be seen that if either arm 17 or 20, or both, engages with its low contact point 18 or 21, current will be supplied to the motor through motor lead 27 provided arm 36 makes contact with the contact element 38. Similarly, if arm 17 or 20 engages the high-point contacts 19 or 22, the motor lead 28 will be energized provided arm 36 engages the contact 39.

Figure 2:
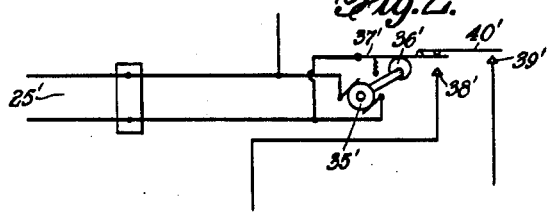
Fig. 2 is a fragmentary diagrammatic view illustrating a modification in the interrupter mechanism.

In the former instance, the valve will be opened through the energization of the motor, but the opening action will be constantly interrupted so that the valve may be only partly opened and not brought at once to a fully opened position, and this applies also to the closing action in the event that one or both of the thermo-responsive elements is exposed to a high temperature. Thus the valve disk of the valve will be caused to more or less float between a fully opened position and a fully closed position and a closer regulation of the condition under control will be obtained as any hunting is minimized. The length of the period of contact of the interrupter 37 with its respective contact elements may also be suitably determined in any well known or special manner as by providing for adjustment of the individual contact elements. Or, and as shown in Fig. 2, a cam 36' continuously driven by motor 35' engages the movable arm 37', connected to one side of the power mains 25', for oscillating the said arm with respect to two contact elements 38' and 39'. These elements, however, are located adjacently in the present embodiment and not upon opposite sides of the arm 37', but they are displaced vertically with respect to each other and are adapted for engagement respectively with two different portions of the arm 37'. The said arm to this end carries a flexible extension 40' projecting beyond its outer end, so that it will engage the uppermost contact element 39' prior to the engagement of element 38' with the main portion of arm 37'.

Figure 3:
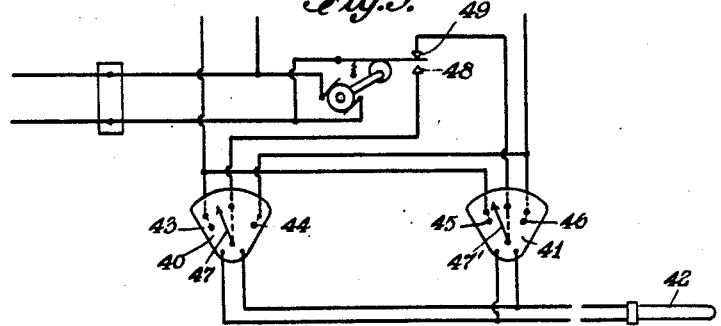
Fig. 3 is a diagrammatic view illustrating a modification in the contact devices and connection of the responsive means associated therewith.

Fig. 3 shows a modification in the arrangement of the contact devices 40 and 41 which, in this embodiment, are both connected in parallel to a common responsive element 42 which, for example, may be located in the outlet of the liquid medium (milk) to be maintained at a constant outlet temperature. The arrangement for controlling the operation of the motor (not shown) for regulation of the valve (not shown) is precisely the same as in the previously described embodiment of Fig. 1, but the action of the motor device is controlled, as stated, solely from one of the liquids. To this end, the low contact point 43 and high contact point 44 of the contact device 40 are spaced further apart than the corresponding low contact point 45 and high contact point 46 of the contact device 41. In the former contact device, this will then effect a response for a greater range of variation in temperature than in the case of the latter contact device 41. Furthermore, the contact-making arm 47 of the device 40 is connected to the contact element 48 which is to be adjusted for a greater period of contact than the corresponding contact element 49 connected to the contact-making arm 47' of the device 41.

Not only is but one responsive element required by this arrangement and thus making for simplicity and economy, but a greater deviation of the temperature in the liquid medium may be accommodated through the greater period of operation of the valve as controlled by one contact device over the other; in other words, with a greater range between the low and high contact points a longer period of contact for motor operation is provided.

Figure 4:
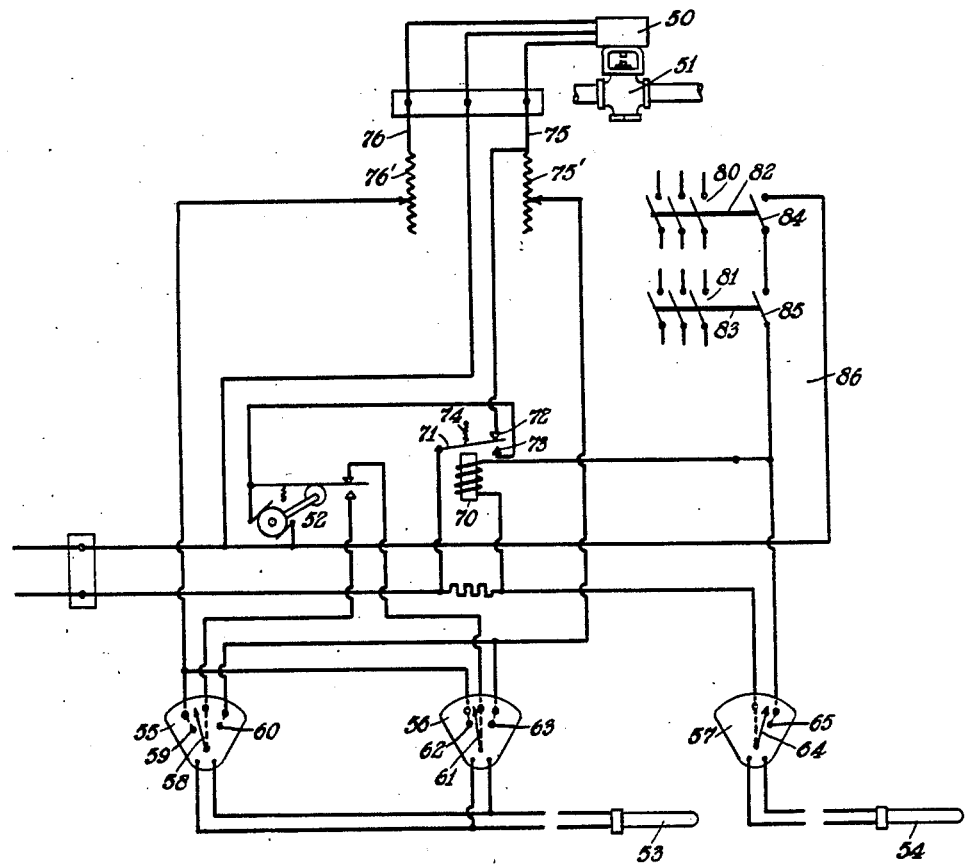
Fig. 4 is a diagrammatic view illustrating the addition of a safety circuit to a system of the nature disclosed in Fig. 1.

Fig. 4 illustrates a further modification in connection with the arrangement described in Fig. 3, more particularly in the provision of a safety circuit whereby operation of the motor device 50 for regulating the valve 51 is such that if a maximum temperature of the heating liquid is exceeded, the motor device will be operated independently of the interrupter device 52 to close rapidly the said valve 51. This also obtains in the event that one or both of the liquid supplying means for the heat-interchanger (not shown) is not operative.

To this end, in addition to the responsive means 53 and contact devices 55 and 56 associated in parallel therewith, a further contact device 57 is provided and is included in series with the responsive means 54 which is to be located in the heat-supplying liquid (water). The contact device 55 is provided as in the hereinbefore described embodiment with the movable contact-making arm 58, a low contact point 59 and a high contact point 60; and the contact device 56 with the contact-making arm 61, a low contact point 62 and a high contact point 63; while the contact device 57 is provided with the movable contact-making arm 64 and only a high contact point 65.

This latter contact point 65, when engaged by its movable contact-making arm 64, is designed to short-circuit an electro-magnet 70 of a relay embodying the spring-drawn armature 71 and upper contact element 72 and lower contact element 73. The said relay, under the action of the armature spring 74, when not energized, causes contact to be made between the said armature 71 and upper contact element 72 to close the circuit to the motor leads 75, and preferably beyond its adjustable resistance 75', operating the motor rapidly in a direction to close valve 51 and also independently of the interrupter means 52 in that it by-passes the same.

The motor lead 76 operates, as in the hereinbefore described embodiment, through adjustable resistance 76' to open the valve and solely through the interrupter means 52. Valve 51 will thus be maintained closed so long as the relay is not energized as the closing action is then more rapid than any opening action resulting from the energization of motor lead 76 operating through interrupter 52. The closing of the valve is thus assured under emergency conditions such as an excessive outlet temperature of the water and as is reflected by contact of arm 64 with contact point 65.

A further emergency condition may arise in the event that the pump motor (not shown) for the heating liquid supply should become inoperative either accidentally or through failure to cut in the same, and, similarly, in the case of the motor (not shown) for the milk supply. The starting switch 80 for the former and the starting switch 81 for the latter are therefore mechanically connected or interlocked, as through the rods 82 and 83, respectively, with circuit closing switches 84 and 85, respectively, and included in series in a circuit 86 for energizing the electromagnet 70. Thus, only when both of the switches 84 and 85 are closed, will the electromagnet 70 be energized and its armature 71 drawn downwardly to engage the contact element 73 and break thereby the circuit at contact element 72.

The system then operates substantially in the manner disclosed in Fig. 3 of the drawings, both opening and closing actions being through the interrupter means; but if either the temperature of the water exceeds the predetermined maximum, or a switch 80 or 81 be in a position to shut off its corresponding motor, the relay will be de-energized, breaking contact at the contact element 73 and re-establishing contact at the contact element 72 for energization of the motor 50 to close valve 51 and independently of the interrupter device.

In Fig. 5 a further modification is indicated, in that a narrow range control is effected by the liquid to be heated and a greater range control by the heat-supplying liquid, while an additional and rapid control is afforded by the liquid to be heated for a temperature which is slightly higher than the desired outlet temperature thereof. To effect these controls, the reversible motor device 90 operates similarly to the embodiment described in connection with the arrangement shown in Fig. 4 to regulate the admission of heating medium through a valve 91 under normal control of the interrupter 92.

A contact device or controller 93 is connected to a thermo-sensitive element or responsive means 94 subject to the temperature of the heat-supplying liquid, while a contact device or controller 95 is connected to an independent thermo-sensitive element or responsive device 96 subject to the temperature of the liquid to be heated. The responsive device 96 is connected in parallel also with a further contact device or controller 97 but having a high contact point 98 which is set to a temperature slightly above the desired outlet temperature of the liquid to be heated. This contact point is adapted for engagement with the movable contact-making arm 99 of the said contact device to short-circuit a relay 100 operative similarly to the corresponding relay of the embodiment shown in Fig. 4, for effecting a rapid closing action of the valve 91 by motor 90 through by-passing of the interrupter 92.

Furthermore, the low contact point 101 and high contact point 102 of contact device 93, and adapted for engagement with the contact-making arm 103 thereof, are arranged for a greater range than the corresponding low and high contact points 104 and 105 of the contact device 95 and which are adapted for engagement with the contact-making arm 106 of this device.

A relatively small variation in the temperature of the liquid to be heated will therefore effect a correction and if this temperature for some reason should exceed a fixed maximum, a more rapid corrective action will be applied through the action of the contact device 97. A greater range, however, is permitted in the variation of the heat-supplying liquid before a corrective action is applied from the source. Thus, various conditions of regulation may be accommodated to suit the different requirements.

I claim:

1. In combination: a reversible electric motor device, means responsive to a condition subject to changes, means regulated by said motor device for supplying a medium to maintain the condition, a pair of independent electrical contact devices affected by the responsive means, a circuit-interrupting member with means to drive the same constantly, and embodying two contact elements adapted for energization through the action of the interrupting means and connected to the respective contact devices, and circuits to the motor device for determining its direction of rotation and adapted to be energized through the contact devices for correspondingly operating the said motor device under control of the contact devices and interrupting means.

2. In combination: a reversible electric motor device, means responsive to a condition subject to changes, means regulated by said motor device for supplying a medium to maintain the condition, a pair of independent electrical contact devices affected by the responsive means, a circuit-interrupting member with means to drive the same constantly, and embodying two contact elements adapted for energization through the action of the interrupting means and connected to the respective contact devices, and circuits to the motor device for determining its direction of rotation and adapted to be energized over different periods of time and through the contact devices for correspondingly operating the said motor device under control of the contact devices and interrupting means.

3. In combination: a reversible electric motor device, means responsive to a condition subject to temperature changes, means regulated by said motor device for supplying a medium to maintain the temperature condition, a pair of independent electrical contact devices affected by the responsive means, a circuit-interrupting member with means to drive the same constantly, and embodying two contact elements adapted for energization through the action of the interrupting means and connected to the respective contact devices, and circuits to the motor device for determining its direction of rotation and adapted to be energized through the contact devices for correspondingly operating the said motor device under control of the contact devices and interrupting means.

4. In combination: a reversible electric motor device, means responsive to a condition subject to changes, means regulated by said motor device for supplying a medium to maintain the condition, a pair of independent electrical contact devices affected by the responsive means, a circuit-interrupting member with means to drive the same constantly, and embodying two contact elements adapted for energization through the action of the interrupting means and connected to the respective contact devices, and circuits to the motor device for determining its direction of rotation and adapted to be energized through the contact devices for correspondingly operating the said motor device under control of the contact devices and interrupting means.

5. In combination: a reversible electric motor device, means responsive to a condition subject to changes, means regulated by said motor device for supplying a medium to maintain the condition, a circuit-interrupting member with means to drive the same constantly, and embodying two contact elements adapted for energization through the action of the interrupting means, and a pair of independent electrical contact devices operated by the responsive means, each contact device embodying a low contact point and a high contact point and a member actuated by the responsive means for engagement with said contact points, the actuated members being connected respectively to the two contact elements, and the low and high contacts of the contact devices being connected respectively to the motor device for operating the same in opposite directions of rotation.

6. In combination: a reversible electric motor device, means responsive to a condition subject to changes, means regulated by said motor device for supplying a medium to maintain the condition, a circuit-interrupting member with means to drive the same constantly, and embodying two contact elements adapted for energization through the action of the interrupting means, and a pair of independent electrical contact devices operated by the responsive means, each contact device embodying a low contact point and a high contact point, the contact points of one of the devices having a closer range than those of the other, and a member actuated by the responsive means for engagement with said contact points, the actuated members being connected respectively to the two contact elements, and the low and high contacts of the contact devices being connected respectively to the motor device for operating the same in opposite directions of rotation.

7. In combination: a reversible electric motor device, a plurality of means responsive to a condition subject to changes, means regulated by said motor device for supplying a medium to maintain the condition, circuit-interrupting means embodying two contact elements adapted for energization through the action of the interrupting means, a pair of independent electrical contact devices operated by the responsive means, each contact device embodying a low contact point and a high contact point and a member actuated by a responsive means for engagement with said contact points, the actuated members being connected respectively to the two contact elements, and the low and high contacts of the contact devices being connected respectively to the motor device for operating the same in opposite directions of rotation, a third contact device embodying a single contact point and a member actuated by another of the responsive means for engagement with said single contact point, a relay controlled by the third contact device, and means controlled by the said relay for by-passing the interrupting means to actuate the motor device in one direction.

8. In combination: a reversible electric motor device, a plurality of means responsive to a condition subject to changes, means regulated by said motor device for supplying a medium to maintain the condition, circuit-interrupting means embodying two contact elements adapted for energization through the action of the interrupting means, a pair of independent electrical contact devices operated by the responsive means, each contact device embodying a low contact point and a high contact point and a member actuated by a responsive means for engagement with said contact points, the actuated members being connected respectively to the two contact elements, and the low and high contacts of the contact devices being connected respectively to the motor device for operating the same in opposite directions of rotation, a third contact device embodying a single contact point and a member actuated by another of the responsive means for engagement with said contact point, and a relay controlled by said third contact device to effect directly and continuously the energization of the motor device for operating the same in a predetermined direction.

9. In combination: a reversible electric motor device, a plurality of means responsive to a condition subject to changes, means regulated by said motor device for supplying a medium to maintain the condition, circuit-interrupting means embodying two contact elements adapted for energization through the action of the interrupting means, a pair of independent electrical contact devices operated by the responsive means, each contact device embodying a low contact point and a high contact point and a member actuated by a responsive means for engagement with said contact points, the actuated members being connected respectively to the two contact elements, and the low and high contacts of the contact devices being connected respectively to the motor device for operating the same in opposite directions of rotation, a third contact device embodying a single contact point and a member actuated by another of the responsive means for engagement with said contact point, and a relay controlled by said third contact device to effect directly and continuously the energization of the motor device for operating the same in a direction to effect the cutting off of the supply of medium.

10. In combination: a reversible electric motor device, a plurality of means responsive to a condition subject to changes, means regulated by said motor device for supplying a medium to maintain the condition, circuit-interrupting means embodying two contact elements adapted for energization through the action of the interrupting means, a pair of independent electrical contact devices operated by the responsive means, each contact device embodying a low contact point and a high contact point and a member actuated by a responsive means for engagement with said contact points, the actuated member being connected respectively to the two contact elements, and the low and high contacts of the contact devices being connected respectively to the motor device for operating the same in opposite directions of rotation, a third contact device embodying a single contact point and a member actuated by another of the responsive means for engagement with said contact point, a relay controlled by the third contact device, a safety circuit controlling the relay, and a circuit controlled by the said relay for by-passing the interrupting means to actuate the motor device in one direction.

11. In combination: a reversible electric motor device, a plurality of means responsive to a condition subject to changes, means regulated by said motor device for supplying a medium to maintain the condition, circuit-interrupting means embodying two contact elements adapted for energization through the action of the interrupting means, a pair of independent electrical contact devices operated by the responsive means, each contact device embodying a low contact point and a high contact point and a member actuated by a responsive means for engagement with said contact points, the actuated member being connected respectively to the two contact elements, and the low and high contacts of the contact devices being connected respectively to the motor device for operating the same in opposite directions of rotation, a third contact device embodying a single contact point and a member actuated by another of the responsive means for engagement with said contact point, and a relay adapted to be de-energized, when the said single contact point is engaged by its actuated member, and to by-pass thereby the interrupter means and effect directly the energization of the motor device for operating the same in a predetermined direction.

12. In combination: a reversible electric motor device, a pair of elements responsive to a condition subject to changes, means regulated by said motor device for supplying a medium to maintain the condition, circuit-interrupting means embodying two contact elements adapted for energization through the action of the interrupting means, a contact device controlled by one of the responsive elements, and a pair of contact devices jointly controlled by the other of the responsive elements, two of said contact devices being connected respectively with the motor device through said two contact elements of the circuit-interrupting means for energizing said motor device for operation of the same in opposite directions of rotation, and means to by-pass the circuit-interrupting means for direct energization of the motor device and for operation thereof in a predetermined direction of rotation, said by-pass means being under the control of the remaining one of the contact devices.

13. In combination: a reversible electric motor device, a pair of elements responsive to a condition subject to changes, means regulated by said motor device for supplying a medium to maintain the condition, circuit-interrupting means embodying two contact elements adapted for energization through the action of the circuit-interrupting means, a contact device controlled by one of the responsive elements and embodying a single contact point and a member actuated by the responsive element for engagement with said contact point, means to by-pass the circuit-interrupting means for direct operation of the motor device and for operation thereof in a predetermined direction of rotation, said by-pass means being actuated by contact between the said single point and its cooperating actuating member, and two additional contact devices jointly controlled by the other of the responsive elements for engagement with said contact points, the actuated members being respectively connected through the circuit-interrupting means to the motor device for operating the latter in opposite directions of rotation, and the high and low contact points of one of the said additional contact devices having a closer range than those of the other contact device.

In testimony whereof I affix my signature.

FRED A. FAUST.